US010091605B2

(12) United States Patent
Lee (10) Patent No.: US 10,091,605 B2
(45) Date of Patent: *Oct. 2, 2018

(54) METHOD OF HANDLING RESOURCE ALLOCATION FOR MTC AND RELATED COMMUNICATION DEVICE

(71) Applicant: Industrial Technology Research Institute, Hsinchu (TW)

(72) Inventor: Chien-Min Lee, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,897

(22) Filed: Jul. 24, 2015

(65) Prior Publication Data

US 2015/0334510 A1    Nov. 19, 2015

Related U.S. Application Data

(63) Continuation of application No. 13/671,526, filed on Nov. 7, 2012, now Pat. No. 9,131,468.

(Continued)

(51) Int. Cl.
*H04W 4/00*    (2018.01)
*H04W 72/04*    (2009.01)
(Continued)

(52) U.S. Cl.
CPC ......... *H04W 4/005* (2013.01); *H04J 11/0069* (2013.01); *H04W 4/70* (2018.02);
(Continued)

(58) Field of Classification Search
CPC ............. H04W 28/0215; H04W 4/005; H04W 74/0841; H04W 76/027; H04W 72/0453;
(Continued)

(56) References Cited

U.S. PATENT DOCUMENTS 8,412,211 B2 *  4/2013  Petrovic ............... H04W 48/10
                                                      370/312
8,509,323 B2     8/2013  Nangia
                      (Continued)

FOREIGN PATENT DOCUMENTS

CN      101507222 A    8/2009
EP      2 408 254 A1   1/2012
                      (Continued)

OTHER PUBLICATIONS

3GPP TS 25.331 V1.1.0 (Jun. 1999).
(Continued)

*Primary Examiner* — Edan Orgad
*Assistant Examiner* — Ivan O Latorre
(74) *Attorney, Agent, or Firm* — Winston Hsu (57) ABSTRACT

A method of performing machine type communication (MTC) for a communication device in a wireless communication system comprises performing a first MTC with a network of the wireless communication system by using a first subband resource of at least one subband resource; and performing a second MTC with the network by using a second subband resource of the at least one subband resource, after performing the first MTC; wherein a carrier frequency of the communication device is switched from a carrier frequency of the first subband resource to a carrier frequency of the second subband resource before performing the second MTC with the network, when the first subband resource and the second subband resource are not in a same maximum bandwidth supported by the communication device.

21 Claims, 11 Drawing Sheets

Related U.S. Application Data (60) Provisional application No. 61/556,841, filed on Nov. 8, 2011, provisional application No. 61/566,019, filed on Dec. 2, 2011.

(51) Int. Cl.
  *H04W 74/08* (2009.01)
  *H04J 11/00* (2006.01)
  *H04W 36/24* (2009.01)
  *H04W 74/00* (2009.01)
  *H04W 4/70* (2018.01)

(52) U.S. Cl.
  CPC ....... *H04W 36/24* (2013.01); *H04W 72/0453* (2013.01); *H04W 74/002* (2013.01); *H04W 74/0833* (2013.01)

(58) Field of Classification Search
  CPC ............... H04W 74/08; H04W 74/008; H04W 72/0406; H04W 48/18; H04W 76/02; H04W 74/006; H04W 48/06; H04W 74/0833; H04W 48/10; H04W 74/002; H04W 36/24; H04W 4/70; H04J 11/0069; H04J 11/0093; H04J 11/0083; H04B 1/7083
  USPC ............... 370/230, 328, 329, 330, 336, 431; 455/422.1, 435.1, 509
  See application file for complete search history.

(56) References Cited

U.S. PATENT DOCUMENTS

| | | | |
|---|---|---|---|
| 2007/0217440 A1 | 9/2007 | Cho | |
| 2008/0049851 A1 | 2/2008 | Nangia | |
| 2009/0116424 A1 | 5/2009 | Abeta | |
| 2010/0027492 A1 | 2/2010 | Asanuma | |
| 2010/0061285 A1* | 3/2010 | Maeda | H04W 4/06 370/312 |
| 2010/0135242 A1 | 6/2010 | Nam | |
| 2010/0159950 A1* | 6/2010 | Toh | H04J 11/0086 455/456.1 |
| 2010/0296410 A1* | 11/2010 | Kazmi | H04W 24/10 370/252 |
| 2011/0019633 A1 | 1/2011 | Tajima | |
| 2011/0041027 A1 | 2/2011 | Fong | |
| 2011/0103449 A1 | 5/2011 | Mcnamara | |
| 2011/0128919 A1* | 6/2011 | Kim | H04W 48/18 370/329 |
| 2011/0177807 A1* | 7/2011 | Cho | H04W 56/00 455/422.1 |
| 2011/0206000 A1 | 8/2011 | Kwon | |
| 2011/0268070 A1 | 11/2011 | Guan | |
| 2011/0292893 A1* | 12/2011 | Lee | H04W 74/002 370/329 |
| 2011/0310854 A1 | 12/2011 | Zou | |
| 2011/0317780 A1 | 12/2011 | Kang | |
| 2012/0099537 A1* | 4/2012 | Leelahakriengkrai | H04W 36/0072 370/329 |
| 2012/0230261 A1 | 9/2012 | Pradas | |
| 2012/0307632 A1 | 12/2012 | Guo | |
| 2013/0039314 A1 | 2/2013 | Prateek | |
| 2013/0130684 A1 | 5/2013 | Gomes | |
| 2014/0080531 A1 | 3/2014 | Du | |
| 2014/0321394 A1* | 10/2014 | Nogami | H04L 5/0044 370/329 |

FOREIGN PATENT DOCUMENTS

| | | |
|---|---|---|
| WO | 2008024577 A1 | 2/2008 |
| WO | 2010035987 A2 | 4/2010 |
| WO | 2010124228 A2 | 10/2010 |
| WO | 2011/065798 A2 | 6/2011 |
| WO | 2011097767 A1 | 8/2011 |

OTHER PUBLICATIONS

3GPP TS 36.321 V8.0.0 (Dec. 2007).
Zyren, "Overview of the 3GPP Long Term Evolution Physical Layer", Rev 0, Jul. 2007, White paper, Document No. 3GPPEVOLUTIONWP, http://www.thepdfportal.com/3gppevolutionwp_103065.pdf.

* cited by examiner

METHOD OF HANDLING RESOURCE ALLOCATION FOR MTC AND RELATED COMMUNICATION DEVICE

CROSS REFERENCE TO RELATED APPLICATIONS

This is a continuation application of U.S. application Ser. No. 13/671,526 filed on Nov. 7, 2012, which claims both the benefit of U.S. Provisional Application No. 61/556,841 filed on Nov. 8, 2011 and the benefit of U.S. Provisional Application No. 61/566,019 filed on Dec. 2, 2011.

BACKGROUND OF THE INVENTION

1. Field of the Invention

The present invention relates to a method used in a wireless communication system and related communication device, and more particularly, to a method of handling resource allocation for a machine type communication (MTC) and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

A machine type communication (MTC) device which can automatically perform predefined jobs and report corresponding results to other devices, a server, a NB or an eNB can be used in various areas, such as security, tracking and tracing, payment, healthcare, metering, etc. Further, the MTC device preferably reports the corresponding results via a wireless link such that limitation caused by environment can be removed. However, the wireless link used by the MTC device is needed to be established, and radio resource required by the wireless link is needed to be allocated (i.e., assigned). Reuse of existing infrastructures and wireless communication systems become a viable choose for operation of the MTC device. Therefore, the UMTS, the LTE system and the LTE-A system, etc., developed by the 3GPP which are widely deployed are suitable for the operation of the MTC device.

However, a number of MTC devices deployed within a geographic area maybe very large for most situations (e.g., metering, security, etc.). That is, an eNB may need to manage (e.g., control, communicate with) thousands to tens of thousands of MTC devices at the same time. In such situations, the eNB which usually manage hundreds of UEs may not be able to manage such large number of MTC devices. For example, a larger number of MTC devices may perform a random access (RA) procedure for communicating with the eNB at the same time. And RA related signalings of different MTC devices may collide with each other such that only a few MTC devices can perform the RA procedure successfully. Thus, large amount of resources may be wasted for performing the RA procedure repeatedly. Thus, resource allocation for the MTC devices becomes a severe problem for existing wireless communication systems, and is a topic to be discussed and addressed.

SUMMARY OF THE INVENTION

The present invention therefore provides a method and related communication device for handling resource allocation for a machine type communication (MTC) and related communication device to solve the abovementioned problems.

A method of performing machine type communication (MTC) for a communication device in a wireless communication system comprises performing a first MTC with a network of the wireless communication system by using a first subband resource of at least one subband resource; and performing a second MTC with the network by using a second subband resource of the at least one subband resource, after performing the first MTC; wherein a carrier frequency of the communication device is switched from a carrier frequency of the first subband resource to a carrier frequency of the second subband resource before performing the second MTC with the network, when the first subband resource and the second subband resource are not in a same maximum bandwidth supported by the communication device.

A communication device for machine type communication (MTC) comprises a storage unit for storing instructions and a processing means coupled to the storage unit. The processing means is configured to execute the instructions stored in the storage unit. The instructions comprises performing a first MTC with a network of the wireless communication system by using a first subband resource of at least one subband resource; and performing a second MTC with the network by using a second subband resource of the at least one subband resource, after performing the first MTC; wherein a carrier frequency of the communication device is switched from a carrier frequency of the first subband resource to a carrier frequency of the second subband resource before performing the second MTC with the network, when the first subband resource and the second subband resource are not in a same maximum bandwidth supported by the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
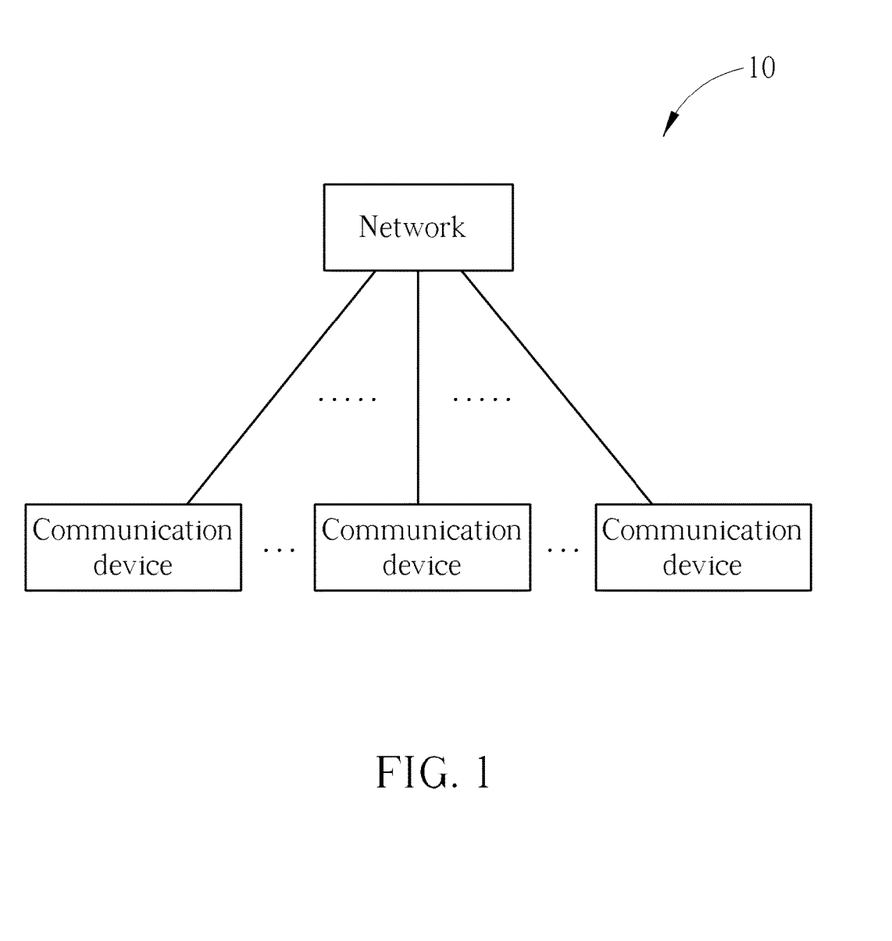
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The communication devices can be machine-type communication (MTC) devices for performing MTC with the network. Alternatively, the communication devices can be mobile phones, laptops, tablet computers, electronic books, and portable computer systems wherein a MTC function is enabled for performing the MTC with the network. The communication devices can also be referred to mobile stations (MSs) or user equipments (UEs) with the MTC function in the UMTS, the LTE system or the LTE-A system, for performing the MTC with the network. Besides, the network and a communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
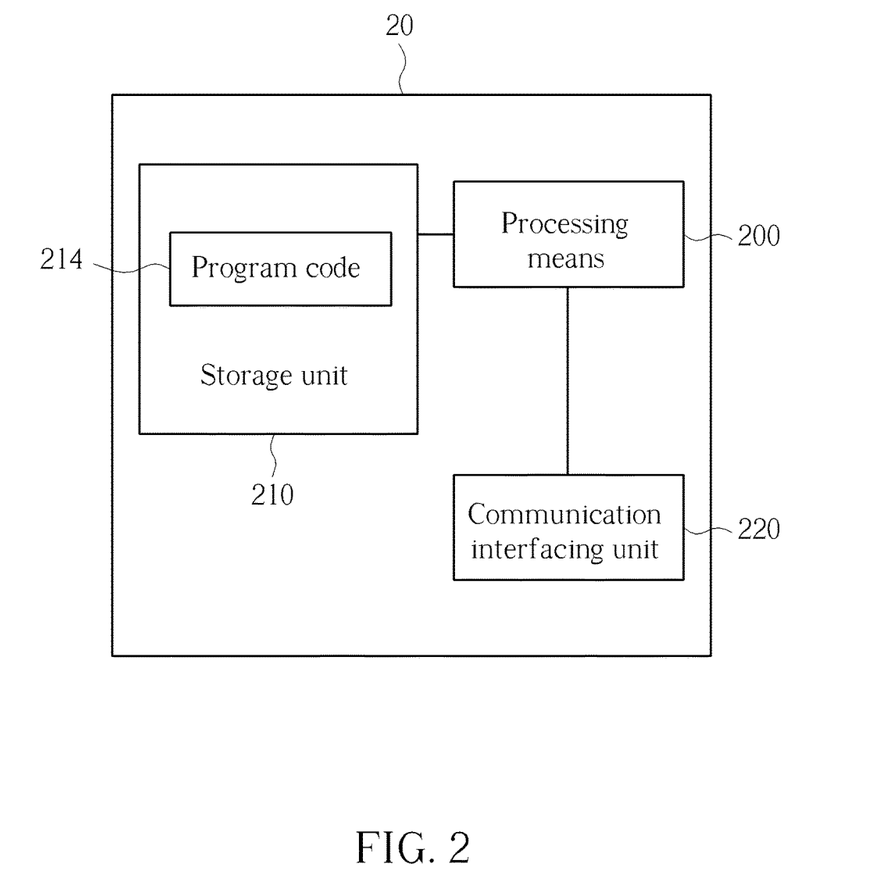
FIG. 2 is a schematic diagram of a communication device according to an example of the present invention.

Please refer to FIG. 2, which is a schematic diagram of a communication device 20 according to an example of the present invention. The communication device 20 can be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
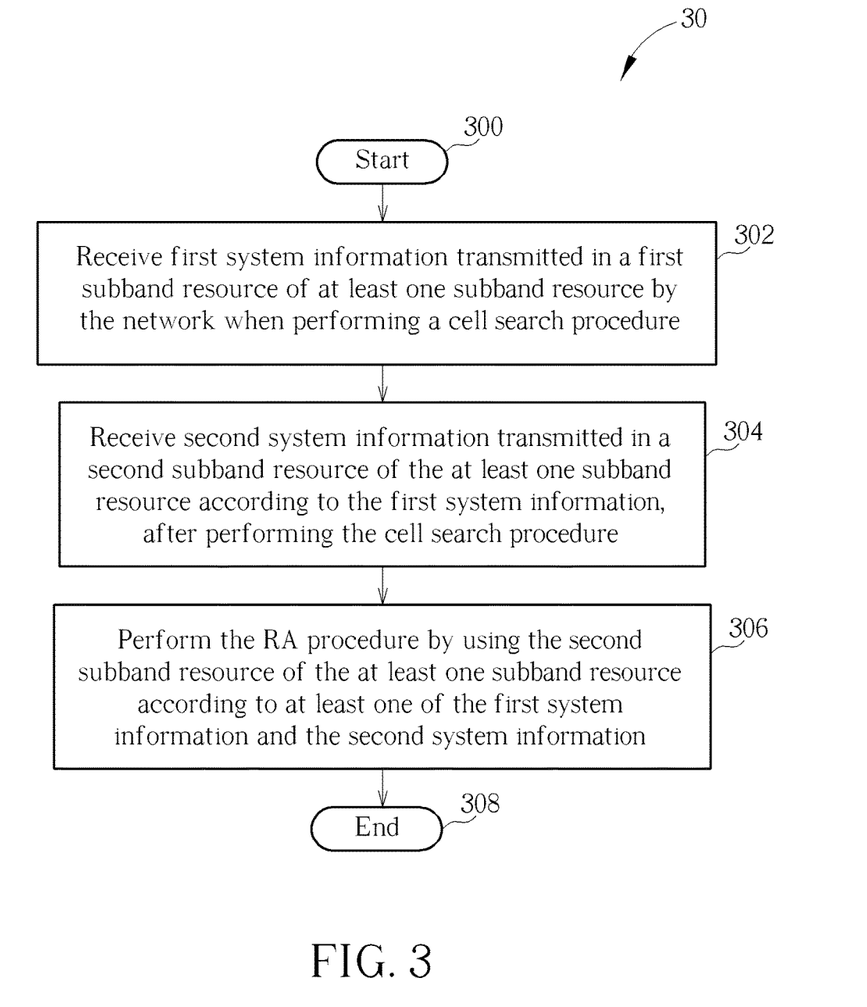
FIG. 3 is a flowchart of a process according to an example of the present invention.

Please refer to FIG. 3, which is a flowchart of a process 30 according to an example of the present invention. The process 30 is utilized in a communication device shown in FIG. 1, for performing a random access (RA) procedure. The process 30 may be compiled into the program code 214 and includes the following steps:

Step 300: Start.

Step 302: Receive first system information transmitted in a first subband resource of at least one subband resource by the network when performing a cell search procedure.

Step 304: Receive second system information transmitted in a second subband resource of the at least one subband resource according to the first system information, after performing the cell search procedure.

Step 306: Perform the RA procedure by using the second subband resource of the at least one subband resource according to at least one of the first system information and the second system information.

Step 308: End.

According to the process 30, the communication device first receives first system information transmitted in a first subband resource of at least one subband resource by the network when performing a cell search procedure. Then, the communication device receives second system information transmitted in a second subband resource of the at least one subband resource according to the first system information, after performing the cell search procedure. Thus, the communication device can perform the RA procedure by using the second subband resource of the at least one subband resource according to at least one of the first system information and the second system information. That is, after performing the cell search procedure, the communication device can use a different subband resource for performing the RA procedure, to avoid that all communication devices use the same subband resource for performing the RA procedure. From another point of view, for each of the communication devices shown in FIG. 1, the network can configure the first system information, to control the communication devices to perform the RA procedure by using various subband resources, so as to distribute (i.e., separate) the communication devices over available physical resource. Please note that, the second system information may not be needed, if information for indicating the second subband resource and for performing the RA procedure can be provided completely in the first system information. Otherwise, the first system information and the second system information are both needed to provide the complete information. As a result, collision probability of RA related signalings can be reduced. Resource for repeating the RA procedure can be saved.

Please note that, a spirit of the process 30 is that the communication devices use various subband resources for performing the RA procedure, to reduce collision probability of RA related signalings, so as to save resource for repeating the RA procedure. Realization of the process 30 is not limited.

Figure 4:
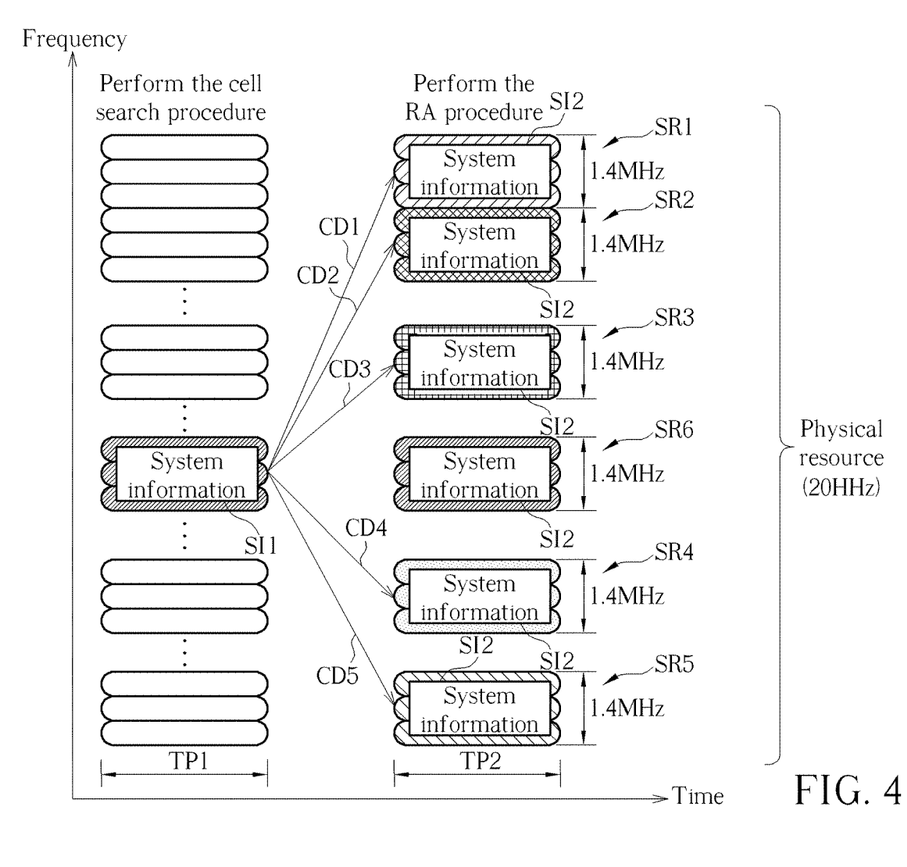
FIG. 4 is a schematic diagram of resource allocation according to an example of the present invention

Please refer to FIG. 4, which is a schematic diagram of resource allocation according to an example of the present invention. As shown in FIG. 4, physical resource managed by the network is divided into 6 subband resources SR1-SR6, wherein each of the subband resources SR1-SR6 may include one or more resource blocks (RBs) within a corresponding subband. Rest of the physical resource is not considered for simplicity. In FIG. 4, 5 communication devices CD1-CD5 all perform the cell search procedure and the RA procedure during time periods TP1-TP2, respectively. The communication devices CD1-CD5 can receive system information SI1 transmitted in the subband resource SR6 during the time period TP1. Thus, each of the communication devices CD1-CD5 can then obtain system information SI2 during the time period TP2 according to the system information SI1. In detail, the system information SI1 may include information indicating each of the communication devices CD1-CD5 where to receive the system information SI2 and/or information for performing the RA procedure, and is not limited herein. For example, after receiving the system information SI1, the communication device CD1 can receive the system information SI2 transmitted in the subband resource SR1 according to the system information SI1. Then, the communication device CD1 can perform the RA procedure according at least one of the system information SI1 and the system information SI2.

As mention above, the system information SI2 may not be needed, if information for indicating the subband resource SR1 and for performing the RA procedure can be provided completely in the system information SI1. Otherwise, the system information SI1 and the system information SI2 are both needed to provide complete information. Preferably, the system information SI1 and the system information SI2 comprise at least one of a carrier frequency of the second subband resource, a bandwidth of the second subband resource, types of applications supported in the second subband resource, antenna information, extended access barring (EAB) information, a physical random access channel (PRACH) resource configuration, a physical downlink shared channel (PDSCH) resource configuration, a physical downlink control channel (PDCCH) resource configuration, a physical uplink shared channel (PUSCH) resource configuration and a physical uplink control channel (PUCCH) resource configuration. That is, part of the channels and parameters can be included in the system information SI1, and the rest is included in the system information SI2.

Similarly, after receiving the system information SI1, the communication devices CD2-CD5 can receive the system information SI2 transmitted in the subband resources SR2-SR5 during the time period TP2, respectively, according to the system information SI1. Then, the communication devices CD2-CD5 can perform the RA procedure according at least one of the system information SI1 and the system information SI2. Note that information in the system information SI2 transmitted in different subband resources may not be the same. Besides, a bandwidth of each of the subband resources SR1-SR5 is 1.4 MHz and a bandwidth of the physical resource is 20 MHz, as shown in FIG. 4. However, the bandwidth of the subband resource can be 3 MHz, 5 MHz, 10 MHz or 20 NHz, and is not limited.

Figure 5:
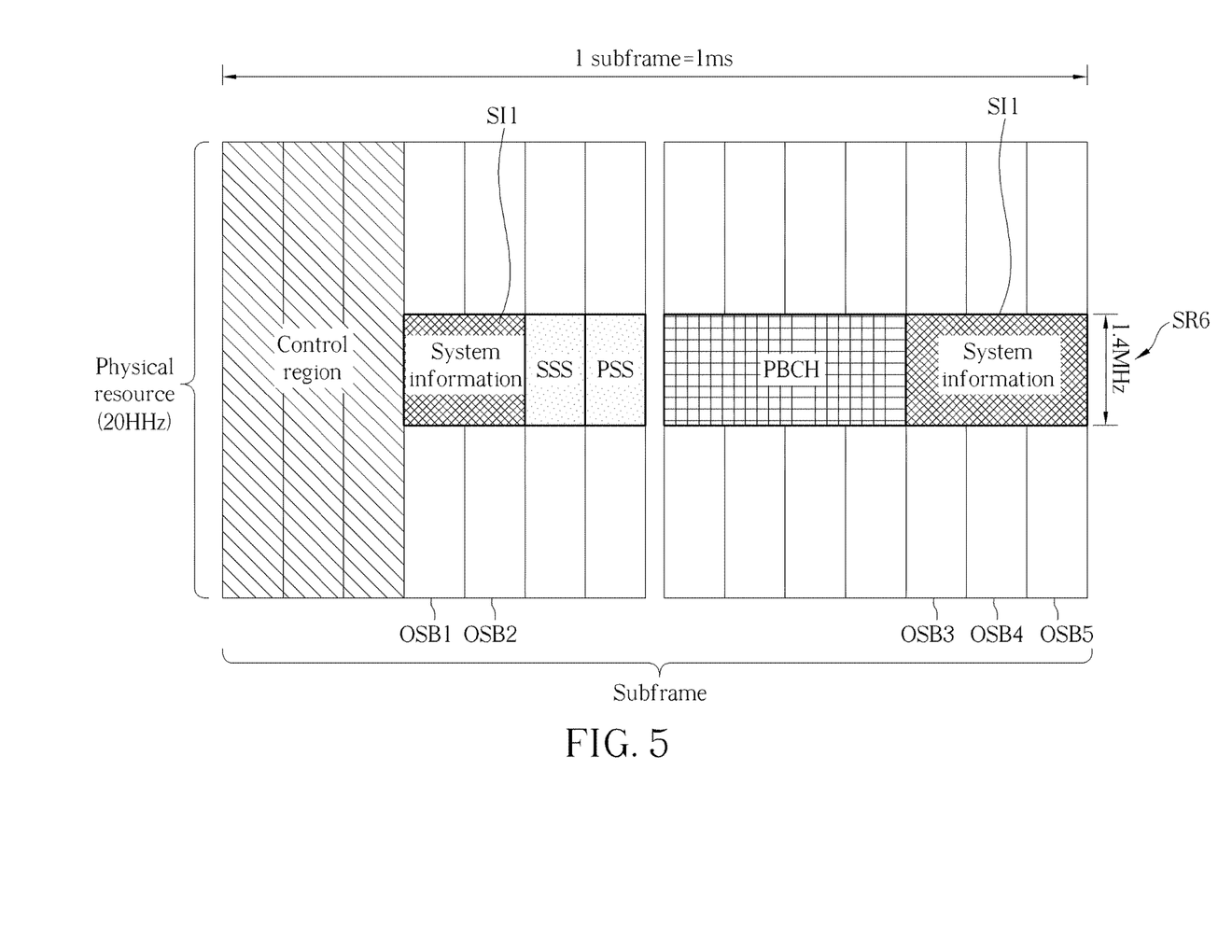
FIG. 5 is a schematic diagram of a subframe in the subband resource according to an example of the present invention.

Please refer to FIG. 5, which is a schematic diagram of a subframe in the subband resource SR6 (during the time period TP1) according to an example of the present invention. As shown in FIG. 5, the subband resource SR6 in the subframe (e.g., the subframe #0) is used by the network for transmitting a physical broadcast channel (PBCH), a primary synchronization signal (PSS) and a secondary synchronization signal (SSS) to a legacy user equipment (UE) in the wireless communication system. And the rest of the subframe, i.e., orthogonal frequency division multiplexing (OFDM) symbols OSB1-0SB5, can be used for transmitting the system information SI1. Please note that, it may be that only part of the OFDM symbols OSB1-0SB5 (e.g., the OFDM symbols OSB1-OSB3) is needed, as long as the part of the OFDM symbols OSB1-0SB5 is sufficient for transmitting the system information SI1. Furthermore, a number of the OFDM symbols used for transmitting the system information SI1 can be fixed. For example, the last few OFDM symbols, e.g., 2 (i.e., OFDM symbols OSB4-5), 3 (i.e., OFDM symbols OSB3-5), etc., are reserved and used for transmitting the system information SI1. Alternatively, the number of the OFDM symbols used for transmitting the system information SI1 can be varied (e.g., according to a signaling transmitted by the network). For example, all the OFDM symbols in the subframe except those used for the control region and the PBCH are used for transmitting the system information SI1. Besides, the SSS and the PSS are placed at (i.e., transmitted via) the sixth OFDM symbol and the seventh OFDM symbol, respectively, in the subframe as shown in FIG. 5, when the wireless communication system is a frequency-division duplexing (FDD) system. When the wireless communication system is a time-division duplexing (TDD) system, the PSS is placed at (i.e., transmitted via) another subframe, i.e., one more OFDM symbol can be used for transmitting the system information SI1. The above description regarding the FDD system can be readily realized in the TDD system after appropriate modifications.

Furthermore, it maybe that the second subband resource is not in a maximum bandwidth supported by a communication device, e.g., the maximum bandwidth supported by the communication device is not large enough to cover a bandwidth of the second subband resource. In this situation, the communication device cannot easily (or completely) receive system information in another subband resource different from which the communication device currently camps on. For example, after receiving the system information SI1, the communication device CD1 may need to switch a carrier frequency of the communication device CD1 from a carrier frequency of the subband resource SR6 to a carrier frequency of the subband resource SR1 according to the system information SI1, before receiving the system information SI2. Note that, in the above example, the communication device CD1 needs to switch the carrier frequency due to that the system information SI2 for the communication device CD1 is transmitted in the subband resource SR1 and the communication device CD1 is unable to receive the system information SI2 in the subband resource SR1 when it camps on the subband resource SR6. When the system information SI2 for the communication device CD1 is still transmitted in the subband resource SR6, i.e., the communication device CD1 is going to perform the RA procedure by using the subband resource SR6, the communication device CD1 does not need to switch the carrier frequency. Alternatively, the maximum bandwidth supported by the communication device CD3 maybe large enough to cover the bandwidths of the subband resource SR3 and the subband resource SR6. In this situation, the communication device CD3 does not need to switch the carrier frequency to receive the system information SI2, even the carrier frequencies of the subband resource SR3 and the subband resource SR6 are different.

On the other hand, when the RA procedure cannot be performed successfully by using the subband resource SR1, the communication device CD1 can perform the RA procedure by using another subband resource (e.g., the subband resource SR3), to increase a possibility of performing the RA procedure successfully. A criterion according to which the communication device CD1 decides to use another subband resource for performing the RA procedure is not limited. For example, the communication device CD1 can decide to use another subband resource, when the RA procedure is not performed successfully by using the subband resource SR1 for a predetermined amount of times (e.g., a predetermined amount of RA failures). Alternatively, the communication device CD1 can decide to use another subband resource, when the RA procedure is not performed successfully by using the subband resource SR1 within a predetermined time interval. In another example, the communication device CD1 can decide to use another subband resource, when the communication device CD1 receives a signaling (e.g., an extended access barring (EAB) signaling) in the subband resource SR1 indicating that the subband resource SR1 is congested (i.e., crowded).

Please note that, a criterion according to which the communication device CD1 selects another subband resource for performing the RA procedure is not limited. For example, the communication device can select another subband resource according to a random selection, i.e., randomly select a (different) subband resource. Besides, as mentioned above, it may be that the another subband resource is not in a maximum bandwidth supported by a communication device, e.g., the maximum bandwidth supported by the communication device is not large enough to cover a bandwidth of the another subband resource. In this situation, the communication device CD1 may need to switch the carrier frequency of the communication device CD1 from the carrier frequency of the subband resource SR1 to a carrier frequency of another subband resource (e.g., the subband resource SR3), before performing the RA procedure.

Figure 6:
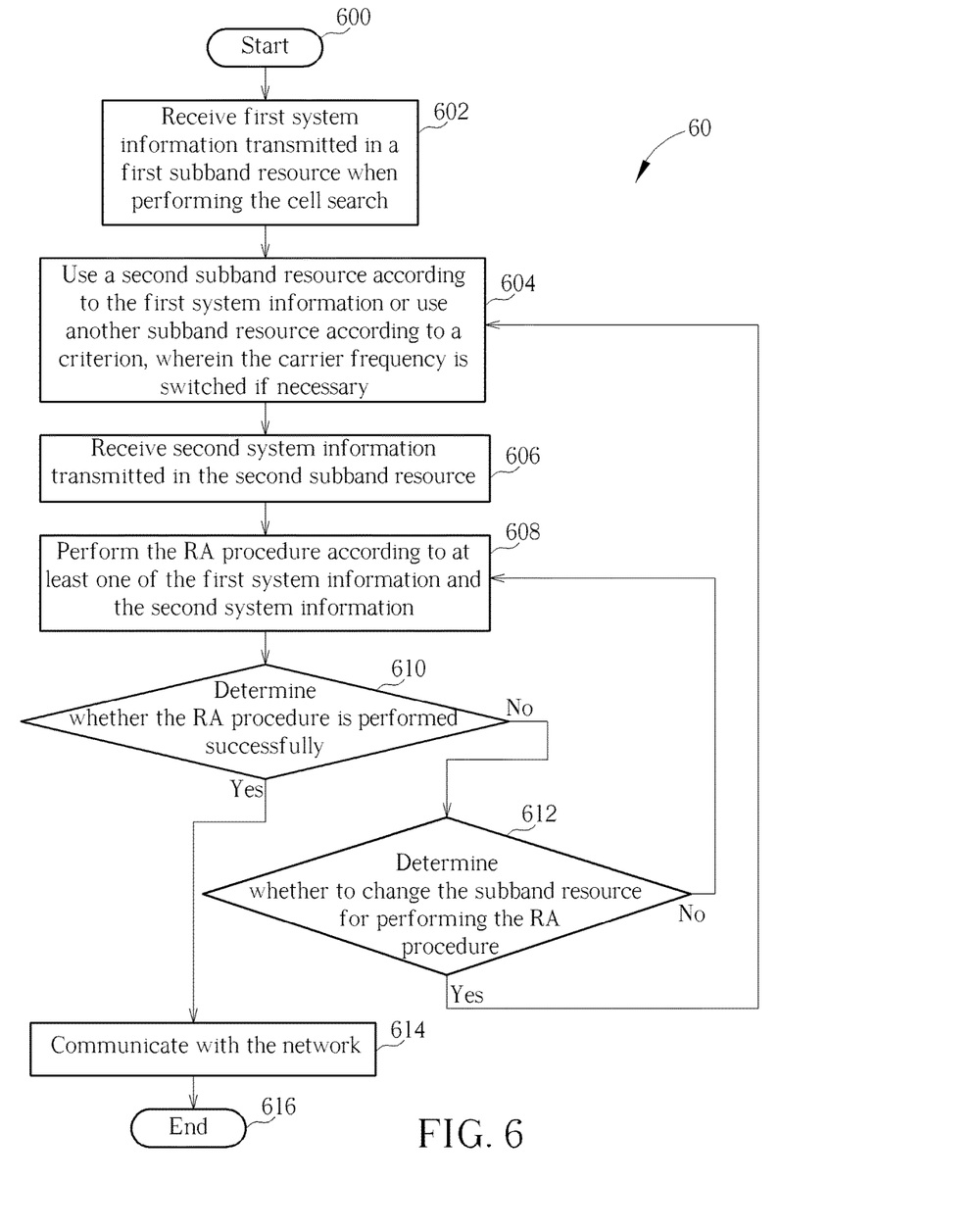
FIG. 6 is a flowchart of a process according to an example of the present invention.

The above description is about a method of performing a RA procedure, and can be summarized into a process 60 as shown in FIG. 6. The process 60 is utilized in a communication device shown in FIG. 1, and includes the following steps:

Step 600: Start.

Step 602: Receive first system information transmitted in a first subband resource when performing the cell search.

Step 604: Use a second subband resource according to the first system information or use another subband resource according to a criterion, wherein the carrier frequency is switched if necessary.

Step 606: Receive second system information transmitted in the second subband resource.

Step 608: Perform the RA procedure according to at least one of the first system information and the second system information.

Step 610: Determine whether the RA procedure is performed successfully. If yes, perform step 614, otherwise, perform step 612.

Step 612: Determine whether to change the subband resource for performing the RA procedure according to the criterion. If yes, perform step 604, otherwise, perform step 608.

Step 614: Communicate with the network.

Step 616: End.

The process 60 is used to illustrate operations of the communication device capable of reducing collision probability of RA related signalings when performing the RA procedure. Detail of the process 60 can be referred to the above illustration, and is not narrated herein.

Figure 7:
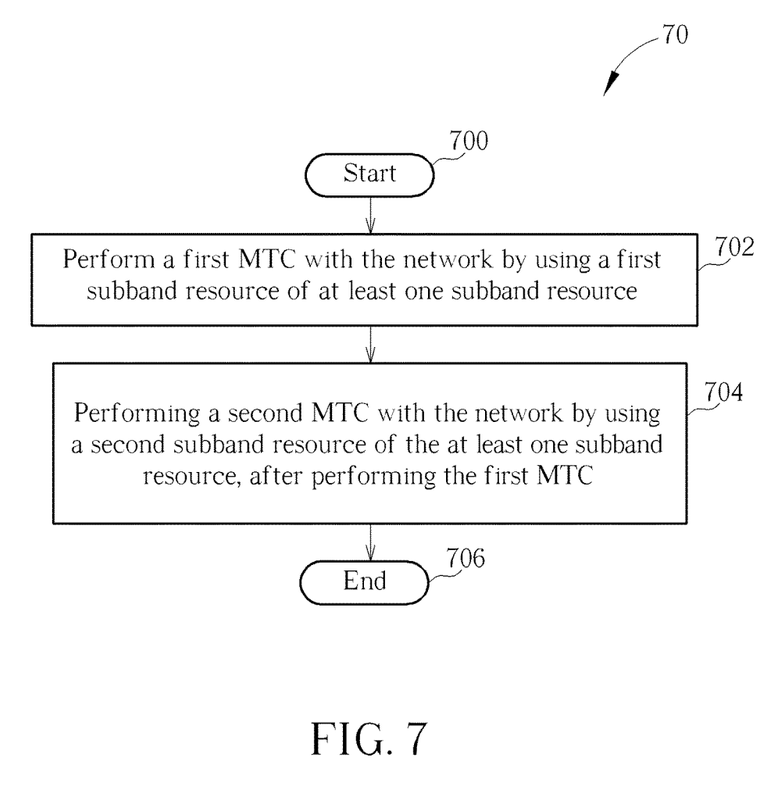
FIG. 7 is a flowchart of a process according to an example of the present invention.

Please refer to FIG. 7, which is a flowchart of a process 70 according to an example of the present invention. The process 70 is utilized in a communication device shown in FIG. 1, for performing MTC with the network. The process 70 may be compiled into the program code 214 and includes the following steps:

Step 700: Start.

Step 702: Perform a first MTC with the network by using a first subband resource of at least one subband resource.

Step 704: Performing a second MTC with the network by using a second subband resource of the at least one subband resource, after performing the first MTC.

Step 706: End.

According to the process 70, the communication device first performs a first MTC with the network by using a first subband resource of at least one subband resource. Then, the communication device performs a second MTC with the network by using a second subband resource of the at least one subband resource, after performing the first MTC. In other words, the communication device does not need to perform MTCs by using the same subband resource, but can perform the MTCs by using various (e.g., different) subband resources. Thus, the subband resources can be exploited flexibly, and congestion occurred in a specific subband resource can be avoided.

Please note that, a spirit of the process 70 is that the communication devices use various subband resources for performing MTCs, to exploit the subband resources flexibly, so as to avoid congestion occurred in a specific subband resource. Realization of the process 70 is not limited.

Figure 8:
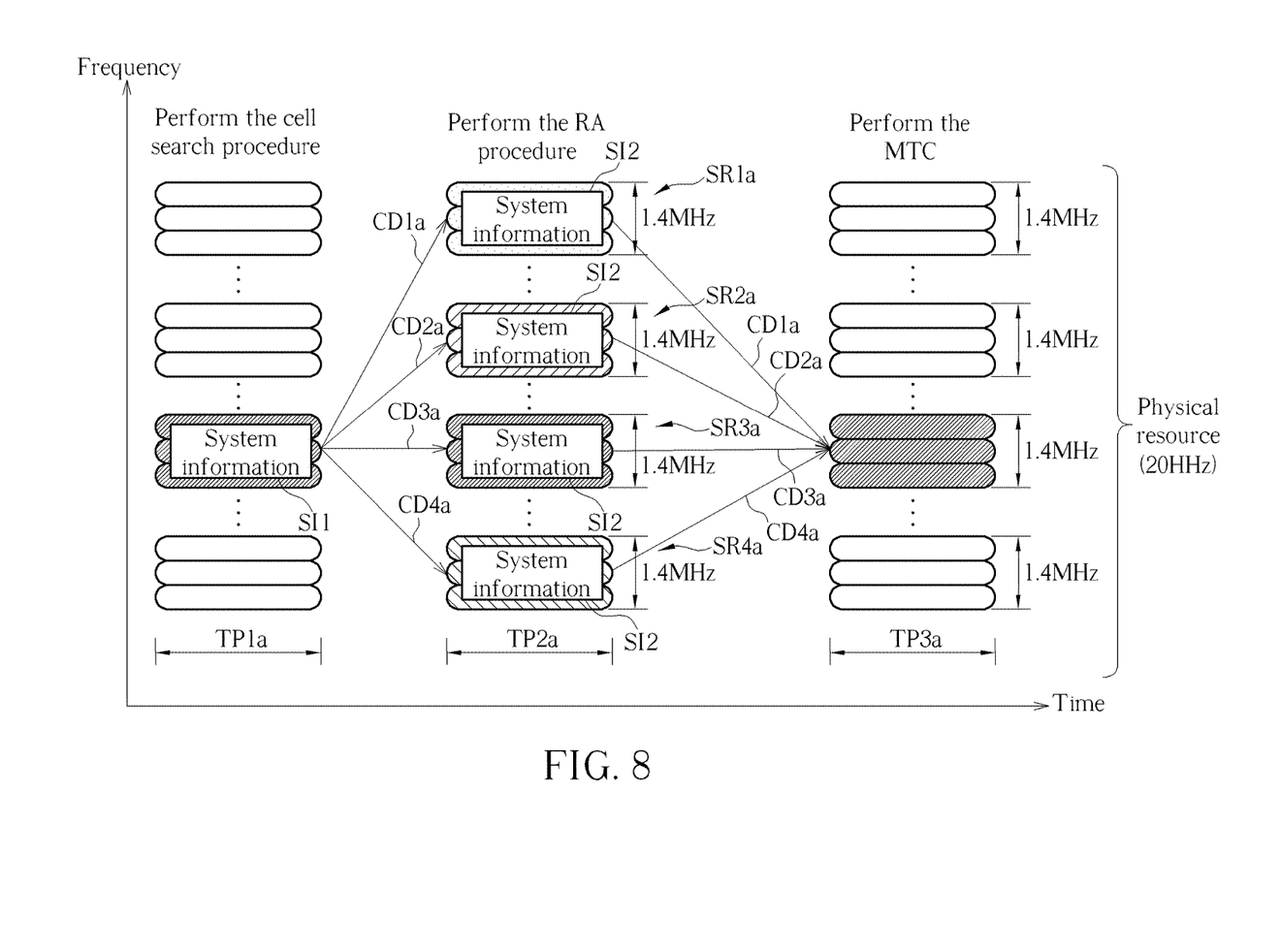
FIG. 8 is a schematic diagram of resource allocation according to an example of the present invention.

Please refer to FIG. 8, which is a schematic diagram of resource allocation according to an example of the present invention. As shown in FIG. 8, physical resource managed by the network is divided into 4 subband resources SR1a-SR4a, wherein each of the subband resources SR1a-SR4a may include one or more RBs within a corresponding subband. Rest of the physical resource is not considered for simplicity. In FIG. 8, 4 communication devices CD1a-CD4a all perform the cell search procedure and the RA procedure during time periods TP1a-TP2a, respectively. The communication devices CD1a-CD4a can receive system information SI1 transmitted in the subband resource SR3a during the time period TP1a. Thus, each of the communication devices CD1a-CD4a can obtain system information SI2 during the time period TP2a according to the system information SI1. In detail, the system information SI1 may include information indicating each of the communication devices CD1a-CD4a where to receive the system information SI2 and/or information for performing the RA procedure, and is not limited herein.

For example, after receiving the system information SI1, the communication device CD1a can receive the system information SI2 transmitted in the subband resource SR1a during the time period TP2a according to the system information SI1. Then, the communication device CD1a can perform the RA procedure according at least one of the system information SI1 and the system information SI2. Similarly, after receiving the system information SI1, the communication devices CD2a-CD4a can receive the system information SI2 transmitted in the subband resources SR2a-SR4a during the time period TP2a, respectively, according to the system information SI1. Then, the communication devices CD2a-CD4a can perform the RA procedure according at least one of the system information SI1 and the system information SI2. After performing the RA procedure, the communication devices CD1a-CD4a start to perform the MTCs with the network by using the subband resource SR3a during a time period TP3a. In other words, the communication devices CD1a-CD4a only use various (e.g., different) subband resources for performing the RA procedure, to perform the RA procedure successfully as soon as possible. After performing the RA procedure, the communication devices CD1a-CD4a reselect the subband resource SR3a, for performing the MTCs with the network.

Figure 9:
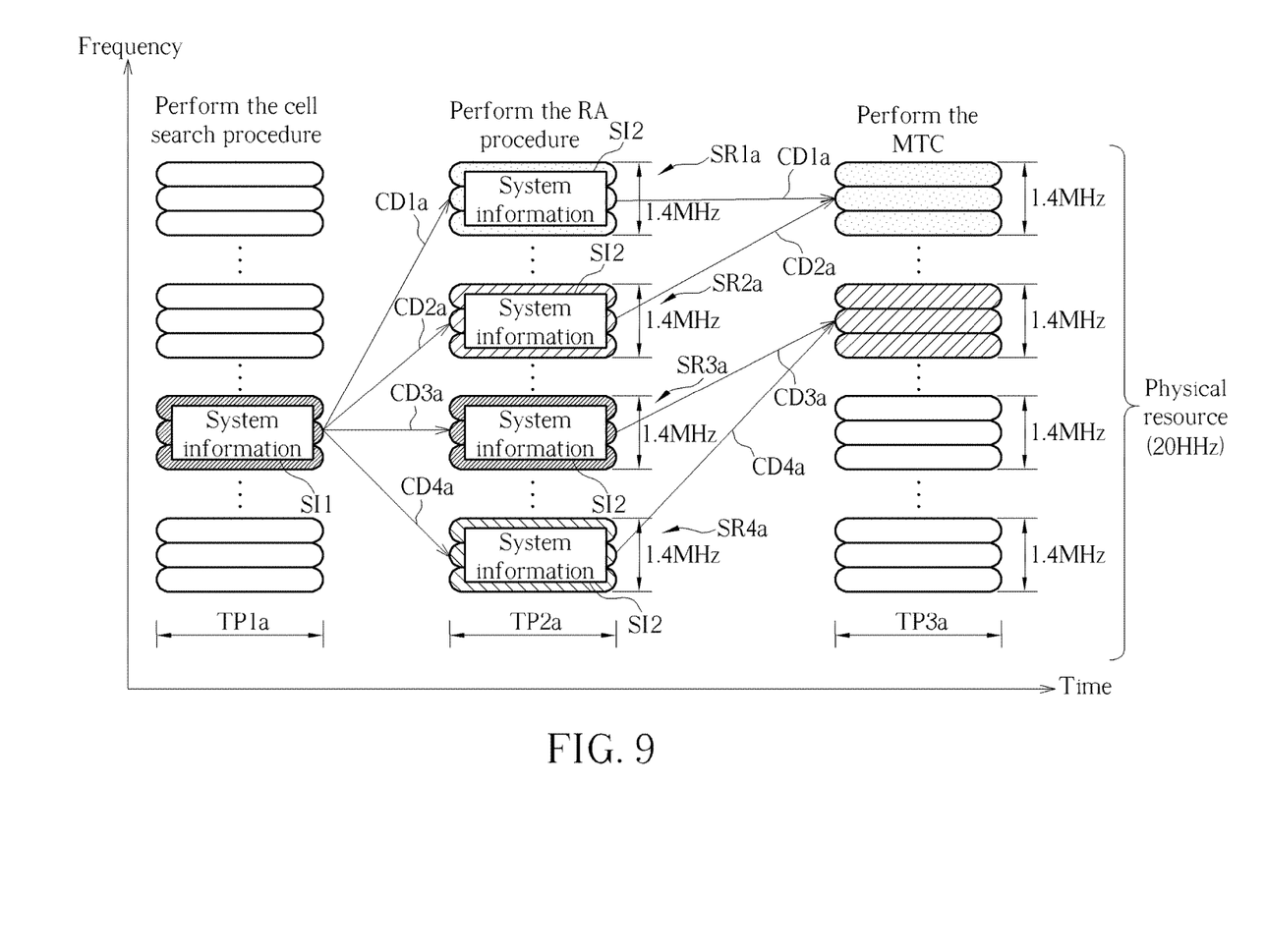
FIG. 9 is a schematic diagram of resource allocation according to an example of the present invention.

Alternatively, the communication devices CD1a-CD4a can select different subband resources, to perform the MTCs with the network. Please refer to FIG. 9, which is a schematic diagram of resource allocation according to an example of the present invention. Different from FIG. 8, after performing the RA procedure, the communication devices CD1a-CD4a select different subband resources, for performing the MTCs with the network during the time period TP3a. As shown in FIG. 9, the communication devices CD1a-CD2a select the subband resource SR1a for performing the MTCs with the network, and the communication devices CD3a-CD4a select the subband resource SR2a for performing the MTCs with the network.

Figure 10:
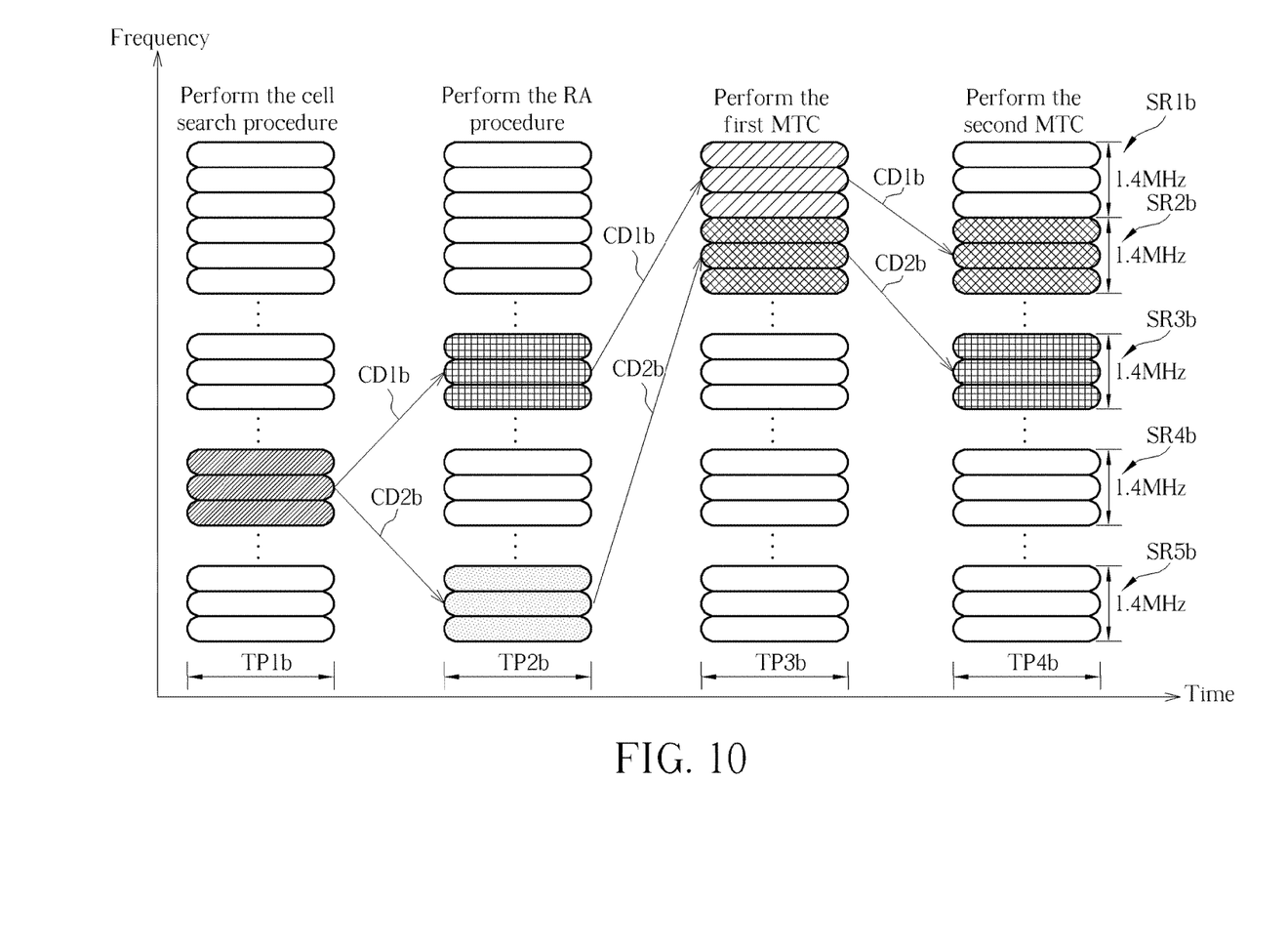
FIG. 10 is a schematic diagram of resource allocation according to an example of the present invention.

Please refer to FIG. 10, which is a schematic diagram of resource allocation according to an example of the present invention. As shown in FIG. 10, physical resource managed by the network is divided into 5 subband resources SR1b-SR5b, wherein each of the subband resources SR1b-SR5b may include one or more RBs within a corresponding subband. Rest of the physical resource is not considered for simplicity. In FIG. 10, 2 communication devices CD1b-CD2b all perform the cell search procedure and the RA procedure during time periods TP1b-TP2b, respectively. Detail of performing the cell search procedure and the RA procedure can be referred to the above description, and is not narrated herein. In short, the communication devices CD1b-CD2b both use the subband resource SR4b for performing the cell search procedure during the time period TP1b. Then, the communication devices CD1b-CD2b use the subband resource SR3b and the subband resource SR5b for performing the RA procedure during the time period TP2b, respectively. After performing the RA procedure, the communication device CD1b performs the first MTC and the second MTC with the network by using the subband resource SR1b (during a time period TP3b) and the subband resource SR2b (during a time period TP4b), respectively. And the communication device CD2b performs the first MTC and the second MTC with the network by using the subband resource SR2b (during the time period TP3b) and the subband resource SR3b (during the time period TP4b), respectively. Thus, the communication devices CD1b-CD2b can exploit the subband resources efficiently and flexibly.

As mentioned above, it maybe that the second subband resource is not in a maximum bandwidth supported by a communication device, e.g., the maximum bandwidth supported by the communication device is not large enough to cover a bandwidth of the second subband resource. In this situation, the communication device cannot easily (or completely) receive system information in another subband resource different from which the communication device currently camps on. For example, a communication device (e.g., the communication device CD1b) may need to switch a carrier frequency of the communication device from a carrier frequency of a first subband resource (e.g., the subband resource SR1b) to a carrier frequency of a second subband resource (e.g., the subband resource SR2b), before performing the MTC (e.g., the second MTC) with the network. Note that, in the above example, the communication device needs to switch the carrier frequency due to that the communication device CD1b is unable to perform the second MTC by using the subband resource SR2b when it camps on the subband resource SR1b. When the MTC is still performed by using the same subband resource, the communication device does not need to switch the carrier frequency. Alternatively, the maximum bandwidth supported by the communication device CD1b may be large enough to cover the bandwidths of the subband resource SR1b and the subband resource SR2b. In this situation, the communication device CD1b does not need to switch the carrier frequency, even the carrier frequencies of the subband resource SR1b and the subband resource SR2b are different.

Please note that, the subband resource mentioned above is preferably referred to activated resources. Besides, when and/or how the communication device switches subband resources (i.e., selects another subband resource) for performing the MTCs is not limited. For example, the communication device can switch (with or without changing the carrier frequency) from the first subband resource to the second subband resource according to at least one of a higher layer signaling transmitted by the network, a random selection (performed by the communication device, or performed and transmitted by the network), an application type performed by the communication device, capability of the communication device and a subband configuration transmitted by the network. That is, the network may indicate, configure or assign the communication device, to switch the subband resources semi-statistically or dynamically, according to the abovementioned methods. Preferably, the communication device should reply an acknowledgement corresponding to the higher layer signaling to the network within a predetermined time interval, after receiving the higher layer signaling. Thus, the communication device may switch the subband resources semi-statistically or dynamically according to the abovementioned causes.

Figure 11:
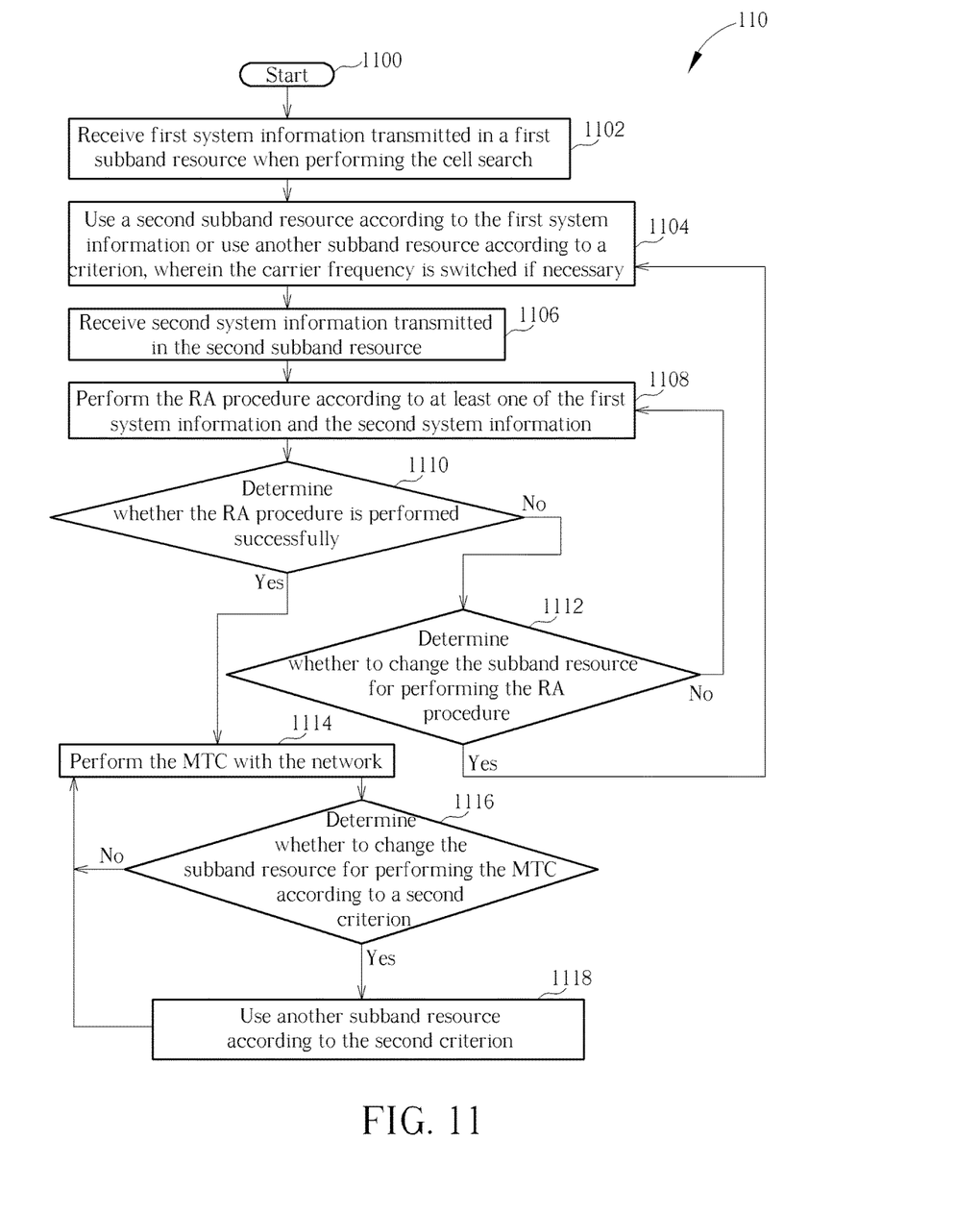
FIG. 11 is a flowchart of a process according to an example of the present invention.

The above description is about a method of performing MTC, and can be summarized into a process 110 as shown in FIG. 11. The process 110 is utilized in a communication device shown in FIG. 1, and includes the following steps:

Step 1100: Start.

Step 1102: Receive first system information transmitted in a first subband resource when performing the cell search.

Step 1104: Use a second subband resource according to the first system information or use another subband resource according to a first criterion, wherein the carrier frequency is switched if necessary.

Step 1106: Receive second system information transmitted in the second subband resource.

Step 1108: Perform the RA procedure according to at least one of the first system information and the second system information.

Step 1110: Determine whether the RA procedure is performed successfully. If yes, perform step 1114, otherwise, perform step 1112.

Step 1112: Determine whether to change the subband resource for performing the RA procedure. If yes, perform step 1104, otherwise, perform step 1108.

Step 1114: Perform the MTC with the network.

Step 1116: Determine whether to change the subband resource for performing the MTC according to a second criterion. If yes, perform step 1118, otherwise, perform step 1114.

Step 1118: Use another subband resource according to the second criterion, and perform step 1114.

The process 110 is used to illustrate operations of the communication device capable of exploiting the subband resources efficiently and flexibly. Detail of the process 110 can be referred to the above illustration, and is not narrated herein.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides methods for handling resource allocation for a communication device (e.g., a MTC device) capable performing MTC with the network. Thus, collision probability of RA related signalings can be reduced, and resource (e.g., subband resource) for repeating the RA procedure can be saved. Furthermore, the resource can be exploited efficiently and flexibly according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing machine type communication (MTC) for a communication device in a wireless communication system, the method comprising:
   performing a first MTC with a cell of a network of the wireless communication system by using a first subband resource of at least one subband resource; and
   performing a second MTC with the cell of the network by using a second subband resource of the at least one subband resource, after performing the first MTC;
   wherein a carrier frequency of the communication device is switched from a carrier frequency of the first subband resource to a carrier frequency of the second subband resource before performing the second MTC with the network, when the first subband resource and the second subband resource are not in a same maximum bandwidth supported by the communication device;
   wherein the first subband resource and the second subband resource are comprised in a plurality of subband resources, and each of the plurality of subband resources are not overlapped.

2. The method of claim 1, wherein each of the at least one subband resource is a division of physical resource managed by the network, and comprises at least one resource block (RB) in a corresponding subband.

3. The method of claim 1, wherein the communication device is a MTC device.

4. The method of claim 1, wherein the communication device selects and switches to the second subband resource according to at least one of a higher layer signaling transmitted by the network, a random selection, an application type performed by the communication device, capability of the communication device and a subband configuration transmitted by the network.

5. The method of claim 4, further comprising:
   replying an acknowledgement corresponding to the higher layer signaling to the network within a predetermined time interval, after receiving the higher layer signaling.

6. The method of claim 1, wherein the communication device performs a cell search procedure when performing the first MTC, and performs a random access (RA) procedure when performing the second MTC.

7. The method of claim 1, wherein a bandwidth of the first subband resource is approximately 1.4 MHz, and a bandwidth of the second subband resource is approximately 1.4 MHz.

8. The method of claim 1, wherein a mapping of a plurality of resource blocks (RBs) in the first subband resource or the first subband resource is aligned with a legacy RB mapping.

9. The method of claim 1, wherein the first subband resource comprises a first plurality of contiguous RBs, and the second subband resource comprises a second plurality of contiguous RBs.

10. The method of claim 1, wherein the first MTC comprises a reception of first system information, the second MTC comprises a reception of second system information, and the reception of the second system information is determined according to the first system information.

11. The method of claim 10, wherein the first system information indicates where to receive the second system information.

12. A communication device for performing machine type communication (MTC), comprising:
   a storage unit for storing instructions of:
      performing a first MTC with a cell of a network of the wireless communication system by using a first subband resource of at least one subband resource; and
      performing a second MTC with the cell of the network by using a second subband resource of the at least one subband resource, after performing the first MTC;
      wherein a carrier frequency of the communication device is switched from a carrier frequency of the first subband resource to a carrier frequency of the second subband resource before performing the second MTC with the network, when the first subband resource and the second subband resource are not in a same maximum bandwidth supported by the communication device;
      wherein the first subband resource and the second subband resource are comprised in a plurality of subband resources, and each of the plurality of subband resources are not overlapped; and
   a processing means, coupled to the storage unit, configured to execute the instructions stored in the storage unit.

13. The communication device of claim 12, wherein each of the at least one subband resource is a division of physical resource managed by the network, and comprises at least one resource block (RB) in a corresponding subband.

14. The communication device of claim 12, wherein the communication device selects and switches to the second subband resource according to at least one of a higher layer signaling transmitted by the network, a random selection, an application type performed by the communication device, capability of the communication device and a subband configuration transmitted by the network.

15. The communication device of claim 14, further comprising:
    replying an acknowledgement corresponding to the higher layer signaling to the network within a predetermined time interval, after receiving the higher layer signaling.

16. The communication device of claim 12, wherein the communication device performs a cell search procedure when performing the first MTC, and performs a random access (RA) procedure when performing the second MTC.

17. The communication device of claim 12, wherein a bandwidth of the first subband resource is approximately 1.4 MHz, and a bandwidth of the second subband resource is approximately 1.4 MHz.

18. The communication device of claim 12, wherein a mapping of a plurality of resource blocks (RBs) in the first subband resource or the first subband resource is aligned with a legacy RB mapping.

19. The communication device of claim 12, wherein the first subband resource comprises a first plurality of contiguous RBs, and the second subband resource comprises a second plurality of contiguous RBs.

20. The communication device of claim 12, wherein the first MTC comprises a reception of first system information, the second MTC comprises a reception of second system information, and the reception of the second system information is determined according to the first system information.

21. The communication device of claim 20, wherein the first system information indicates where to receive the second system information.

* * * * *